United States Patent
Saunders et al.

(10) Patent No.: US 9,549,318 B2
(45) Date of Patent: Jan. 17, 2017

(54) SYSTEM AND METHOD FOR DELAYED DEVICE REGISTRATION ON A NETWORK

(71) Applicant: Shaw Cablesystems G.P., Calgary (CA)

(72) Inventors: Christian Saunders, Calgary (CA); Ron Angerame, Calgary (CA)

(73) Assignee: SHAW CABLESYSTEMS G.P., Calgary, Alberta (CA)

( * ) Notice: Subject to any disclaimer, the term of this patent is extended or adjusted under 35 U.S.C. 154(b) by 221 days.

(21) Appl. No.: 14/050,844

(22) Filed: Oct. 10, 2013

(65) Prior Publication Data

US 2015/0106517 A1   Apr. 16, 2015

(51) Int. Cl.
*H04L 12/911* (2013.01)
*H04W 12/06* (2009.01)
*H04L 29/06* (2006.01)

(52) U.S. Cl.
CPC .......... *H04W 12/06* (2013.01); *H04L 63/0428* (2013.01); *H04L 63/0807* (2013.01)

(58) Field of Classification Search
CPC ......... H04L 47/70; H04L 29/06; H04M 15/00; H04M 11/00; H04W 8/02; H04W 48/04; H04W 4/02; G06F 21/00; G06F 17/60
See application file for complete search history.

(56) References Cited

U.S. PATENT DOCUMENTS

| | | | |
|---|---|---|---|
| 8,407,465 B2 | 3/2013 | Naaman et al. | |
| 2003/0233332 A1 | 12/2003 | Keeler et al. | |
| 2004/0073784 A1* | 4/2004 | Ishidoshiro | H04L 63/0492 713/151 |
| 2008/0076425 A1* | 3/2008 | Khetawat et al. | 455/436 |
| 2010/0107225 A1 | 4/2010 | Spencer et al. | |
| 2010/0190470 A1 | 7/2010 | Raleigh | |
| 2011/0086612 A1* | 4/2011 | Montz | H04L 63/083 455/410 |
| 2012/0050455 A1* | 3/2012 | Santamaria et al. | 348/14.11 |
| 2012/0202459 A1 | 8/2012 | Martell et al. | |
| 2012/0214441 A1 | 8/2012 | Raleigh | |
| 2012/0264402 A1* | 10/2012 | Zhang | H04L 63/0815 455/411 |
| 2013/0227284 A1* | 8/2013 | Pfeffer et al. | 713/168 |
| 2013/0318343 A1* | 11/2013 | Bjarnason | H04L 41/0809 713/157 |

* cited by examiner

*Primary Examiner* — Hua Fan
*Assistant Examiner* — Nasim Nirjhar
(74) *Attorney, Agent, or Firm* — Bereskin & Parr LLP/S.E.N.C.R.L., s.r.l.

(57) ABSTRACT

Systems and methods for enabling a computing device to be registered and authorized for network access, while deferring device hardware address capture until a later time. Subsequently, when the computing device connects to a network location at which the hardware address can be detected registration and authorization can be fully completed. In some cases, the subsequent completion can be performed automatically and without user intervention.

17 Claims, 4 Drawing Sheets

SYSTEM AND METHOD FOR DELAYED DEVICE REGISTRATION ON A NETWORK

FIELD

The described embodiments relate to authenticating computing devices on a network and, in particular, to authenticating computing devices on a wireless network.

BACKGROUND

Computing devices, such as personal computers, tablets and smartphones, can be configured to execute a wide variety of software applications. Increasingly, these applications leverage network connectivity—to the Internet, for example—to provide various information, services and other functionality. One such application is a web browser.

Some computing devices, such as smartphones, may have cellular data capability that allows for network access nearly anywhere within a wide cellular coverage area. Even so, the cost associated cellular data usage may spur users to use Wireless Local Area Network (WLAN) connectivity where it is available. Moreover, many other computing devices, such as personal computers and tablets, may lack cellular data capability, and instead rely on WLAN connectivity to access a data network. In general, WLAN connections have more limited range than cellular connections. However, for many users WLAN connectivity may be preferred for its lower cost, despite the range restrictions.

Recognizing that not all network-capable computing devices have cellular connectivity, some network service providers now offer network access at one or more WLAN "hotspots". Hotspots comprise WLAN access points that are generally provided at locations that may be convenient for users, such as at coffee shops, shopping malls, airports and elsewhere. Some hotspots may be freely accessible by the public, while others may require authorization. Authorization may be determined prior to connection (e.g., a pre-existing subscription with the network service provider), or at the time of connection (e.g., an on-demand fee payment).

SUMMARY

In a first broad aspect, there is provided a method of hardware address based registration of a computing device on a second network from a first network, the method comprising: accessing a portal server via a network access device on the first network, wherein a hardware address of the computing device is not determinable by the portal server on the first network; receiving a registration token from the portal server, the registration token generated by the portal server in response to determining that the network access device is identified in a database; accessing the portal server directly via the second network, wherein the hardware address of the computing device is determinable by the portal server on the second network; transmitting the registration token to the portal.

The network access device may be a modem. The network access device may be recognized in the database based on a network access device hardware address.

The first network may comprise a wired network, which may comprise a coaxial cable network or a public switched telephone network.

The second network may comprise a wireless network, which may comprise a wireless local area network or a wireless metropolitan area network.

The portal server may provide an HTTP or HTTPS service.

The registration token may comprise a browser cookie.

The registration token may comprise a subscriber identifier or a hash message authentication code.

The hardware address may be a media access control (MAC) address.

In another broad aspect, there is provided a method of hardware address based registration of a computing device on a second network from a first network, the method comprising: receiving a registration request from the computing device via the first network; determining that a hardware address of the computing device is not determinable on the first network; detecting a hardware address associated with the registration request; identifying a subscriber record based on a hardware address of a network access device used by the computing device; generating a registration token associated with the subscriber record; transmitting the registration token to the computing device; receiving the registration token via the second network; determining a hardware address of the computing device via the second network; and associating the hardware address with the subscriber record.

The subscriber record may have a subscriber identifier, and the registration token may comprise the subscriber identifier.

The registration token may comprise a hash message authentication code, and the method may further comprise authenticating the hash message authentication code.

In another broad aspect, there is provided a system for hardware address based registration of a computing device on a second network from a first network, wherein the computing device is connected via a network access device to the first network, the system comprising: a portal server operatively coupled to the first network and configured to receive a registration request from the computing device via the first network; a registration server operatively coupled to the portal server and configured to: determine that a hardware address of the computing device is not determinable on the first network; identify a subscriber record based on a hardware address of the network access device used by the computing device; detect a hardware address associated with the registration request; generate a registration token associated with the subscriber record; transmit the registration token to the computing device (via the registration portal); an access portal operatively coupled to the registration server and to the second network, and configured to: receive the registration token via the second network; determine a hardware address of the computing device via the second network; and associate the hardware address with the subscriber record.

BRIEF DESCRIPTION OF THE DRAWINGS

A preferred embodiment of the present invention will now be described in detail with reference to the drawings, in which.

DESCRIPTION OF EXEMPLARY EMBODIMENTS

Figure 1:
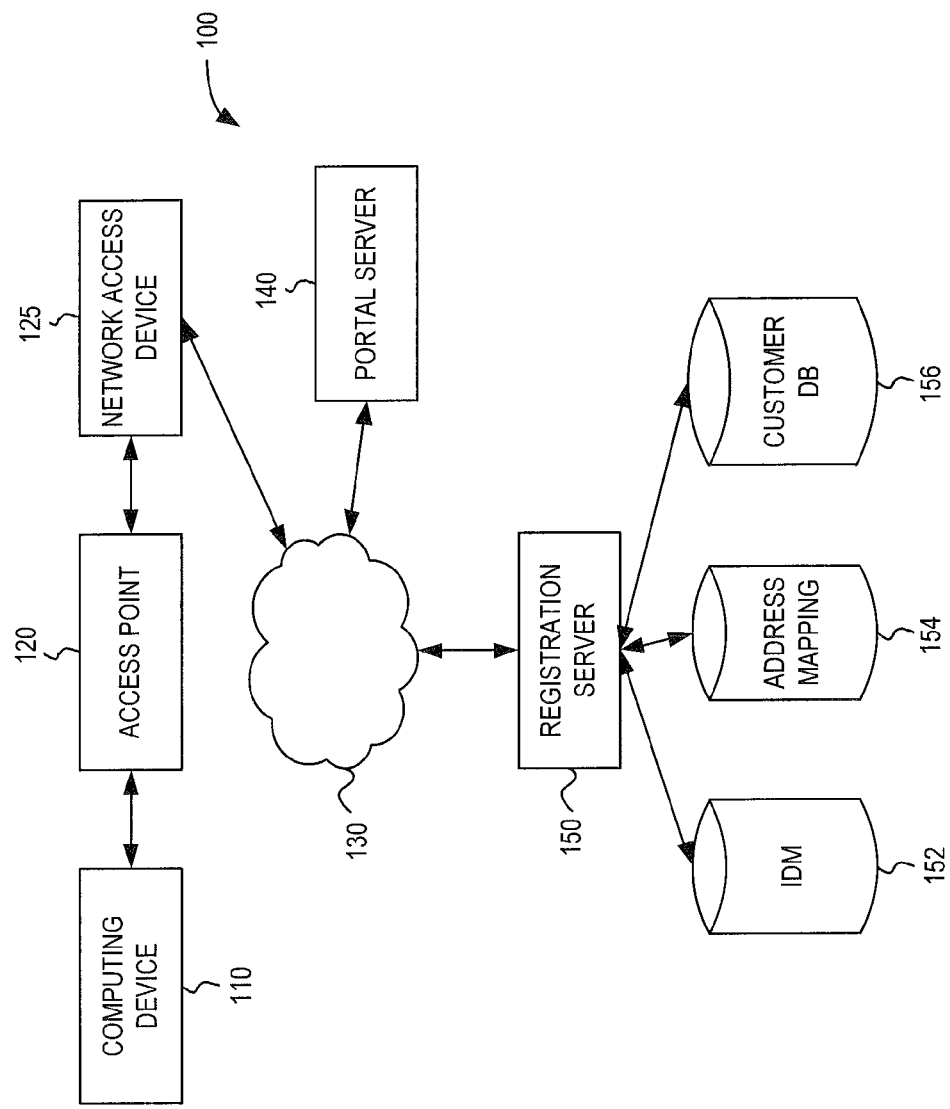
FIG. 1 is a block diagram of a token registration system in accordance with at least one example embodiment.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail since these are known to those skilled in the art. Furthermore, it should be noted that this description is not intended to limit the scope of the embodiments described herein, but rather as merely describing one or more exemplary implementations.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, set-top box, embedded device, computer expansion module, personal computer, laptop, smartphone or any other computing device capable of being configured to carry out the methods described herein.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a non-transitory computer readable storage medium (e.g. read-only memory, magnetic disk, optical disc). The storage medium so configured causes a computer to operate in a specific and predefined manner to perform the functions described herein.

While particular combinations of various functions and features are expressly described herein, other combinations of these features and functions are possible that are not limited by the particular examples disclosed herein, and these are expressly incorporated within the scope of the present invention.

As the term module is used in the description of the various embodiments, a module includes a functional block that is implemented in hardware or software, or both, that performs one or more functions such as the processing of an input signal to produce an output signal. As used herein, a module may contain submodules that themselves are modules.

When a network service provider deploys one or more hotspots, it is generally desirable to provide a convenient way for users to authenticate against a database of authorized users. In many cases, the network service provider may have a database of subscribers to one or more services, which may include services other than the hotspot. For example, a cable service provider may have a database of cable television and cable Internet subscribers. If the cable service provider also operates one or more hotspots, these databases of existing subscribers can be leveraged to offer access to the hotspots, subject to subscription rules.

Subscribers may find it inconvenient to remember their subscription account particulars, such as username, password, account number, or the like. However, if a subscriber's computing device is used at a network location that is known to be associated with the subscriber, the computing device may be associated with the subscriber's account, such that subsequently authentication of the computing device can be simplified when an attempt is made to use a different service (e.g., hotspot).

A hardware address, such as a Media Access Control (MAC) address, may be used to uniquely identify each computing device. MAC addresses are unique identifiers assigned to network interfaces for communications. However, MAC addresses are generally not readily discernible across inter-connected networks, such as the Internet. In the context of a cable Internet network, the MAC address of a device on the subscriber's local area network (LAN) may not be discernible to a device located elsewhere on the network, which means that data intended for each computing device can only be addressed using an Internet Protocol (IP) address.

In some cases, devices on a LAN may only have IP addresses that are within a private address range that is not routable over the public Internet. An access point or network access device may thus employ Network Address Translation (NAT) to share a public IP address between a plurality of devices in the LAN.

For a subscriber to register a computing device to use another service, such as wireless hotspots, one common approach is to require the subscriber to manually provide the MAC address of the computing device at a website.

Other conventional MAC-based approaches include:
providing the MAC address in a portal page;
using a connection client application that is configured to determine the MAC address and provide it to a portal; and/or
requiring registration only while connected to the service provider's network, so that MAC address can be directly determined.

To avoid use of MAC addresses, some other approaches are sometimes also used, and may be required to authenticate computing devices for access to a network:
provide a user name and password in a portal page;
use a connection client application on the computing device that is specifically configured to connect to a specific network; and/or
obtain Subscriber Identity Module (SIM) information.

Still other approaches eschew authentication at all, allowing open access to the network, which can pose a security hazard.

Each of these conventional approaches can be unreliable and difficult or inconvenient for subscribers.

The described embodiments enable a computing device to be registered and authorized for network access, while deferring MAC address capture until a later time. Subsequently, when the computing device connects to a network location at which the MAC address can be detected (e.g., a hotspot operated by the service provider), the registration and authorization can be fully completed. In some cases, the subsequent completion can be performed automatically and without user intervention.

In at least some embodiments, an initial registration action may involve navigating to a registration website using an application or web browser of the computing device. The website may be used to validate that the user, and the user's computing device, are eligible for deferred registration and authentication. Eligibility can be determined at any network location, for example, using a subscriber username and password.

Alternatively, eligibility can be determined when the subscriber is connected via a network connection to a network operated by the service provider (e.g., to a cable modem on a cable provider's network). In this case, the subscriber's account information can be determined by performing a lookup based on an intermediate device used to connect to the network (e.g., cable modem).

Once initial validation is complete, a token may be generated and provided to the computing device. The token can be a browser cookie, for example. The token contains information usable to complete deferred registration, which may be encrypted or signed. The computing device subsequently stores the token until it is required to complete registration.

When the computing device subsequently attempts to connect at a different network location operated by the service provider (e.g., hotspot), the device may be forwarded to a registration interface (e.g., captive portal). The registration interface requests a previously-provided token, which is verified. If the verification is successful, the registration interface can determine the MAC address of the computing device and complete registration. On subsequent connections to the network, the device's MAC address can be used to automatically authenticate the computer device.

Referring now to FIG. 1, there is illustrated a block diagram of a token registration system 100. Token registration system 100 generally has a network on which the MAC address of a computing device 110 is not discernible by another device, due to the presence of an intermediate device, such as a WLAN access point 120 or network access device 125. In at least some embodiments, token registration system 100 may be part of a cable service provider data network or a digital subscriber line (DSL) service provider data network.

Token registration system 100 includes a WLAN access point 120, a network access device 125, a data network 130, a portal server 140, a registration server 150, an identity management (IDM) server 152, an address mapping server 154, and a customer database server 156. In some embodiments, one or more elements of token registration system 100 may be further subdivided or combined. For example, the functions of address mapping server 154 and customer database server 156 may be integrated, such that only a single physical server performs both functions.

Computing device 100 generally has a processor, memory (both volatile and non-volatile), communications interface, display and one or more input devices such as a keyboard or touchpad. Examples of computing device 100 include a personal computer, tablet computer, smartphone, and the like. The communications interface of computing device 100 may be a wireless communications interface, such as that used for the IEEE 802.11 family of protocols. Optionally, the communications interface may be used for other wireless communications interfaces (e.g., WiMAX).

Access point 120 may be a WLAN access point, which is configured to relay data packets between one or more wirelessly-connected computing devices 110 and another wired network device, such as network access device 125. Network access device 125 is generally configured to convert data from one protocol to another, in order to accommodate different physical interfaces. For example, network access device 125 may be a cable modem configured to relay data packets between an Ethernet LAN and a cable network that uses the Data Over Cable Service Interface Specification (DOCSIS) standards for data communication.

In some embodiments, access point 120 and network access device 125 may be integrated in one unit, while in other embodiments, network access device 125 may be omitted.

Network 130 is a data communications network, such as the Internet. It will be appreciated that network 130 may be comprised of two or more other interconnected wired or wireless networks, such as a public switched telephone network or cable network, including the network service provider "plant" and backbone network.

Portal server 140 is a computer server that generally has a processor, memory and a communications interface. Portal server 140 may be configured to provide a Hypertext Transfer Protocol (HTTP) server or, preferably, a Hypertext Transfer Protocol Secure (HTTPS) server, either of which may be used to provide an initial registration service as described herein.

Registration server 150 is also a computer server and may be analogous to portal server 140. Registration server 150 may be configured to provide access to one or more registration functions through a predefined Application Programming Interface (API). The API may define an expected format for supported requests and responses to the registration server 150 (e.g., eXtensible Markup Language (XML) keys and values).

Registration server 150 generally provides access to one or more backend services provided by IDM server 152, address mapping server 154 and customer database server 156.

In some embodiments, one or more functions of portal server 140, registration server 150, IDM server 152, address mapping server 154 and customer database server 156 may be integrated in a single server, or further subdivided among additional servers.

IDM server 152 is generally a computer server configured to respond to authentication requests. IDM server 152 maintains or has access to a database of subscriber credentials (e.g., username, password, etc.), along with respective authorization or authentication levels, and provides a secure interface for authentication requests.

Address mapping server 154 is a computer server or database that stores a mapping of Internet Protocol (IP) addresses to MAC addresses of devices known or authorized to access a service provider network. For example, in a cable data network, the MAC address of each cable modem (i.e., network access device) active on the service provider network may be stored by address mapping server 154 and correlated with a current IP address assigned to the respective cable modem (e.g., by a Dynamic Host Configuration Protocol (DHCP) server, not shown).

Customer database server 156 is a computer server or database that stores subscriber records, such as address information, billing information, subscription information and the like. In general, customer database server 156 does not store authentication information, which is instead maintained by IDM server 152. However, subscriber records in customer database server 156 may be linked with subscriber credentials in IDM server 152 using a unique key or identifier, for example.

Figure 2:
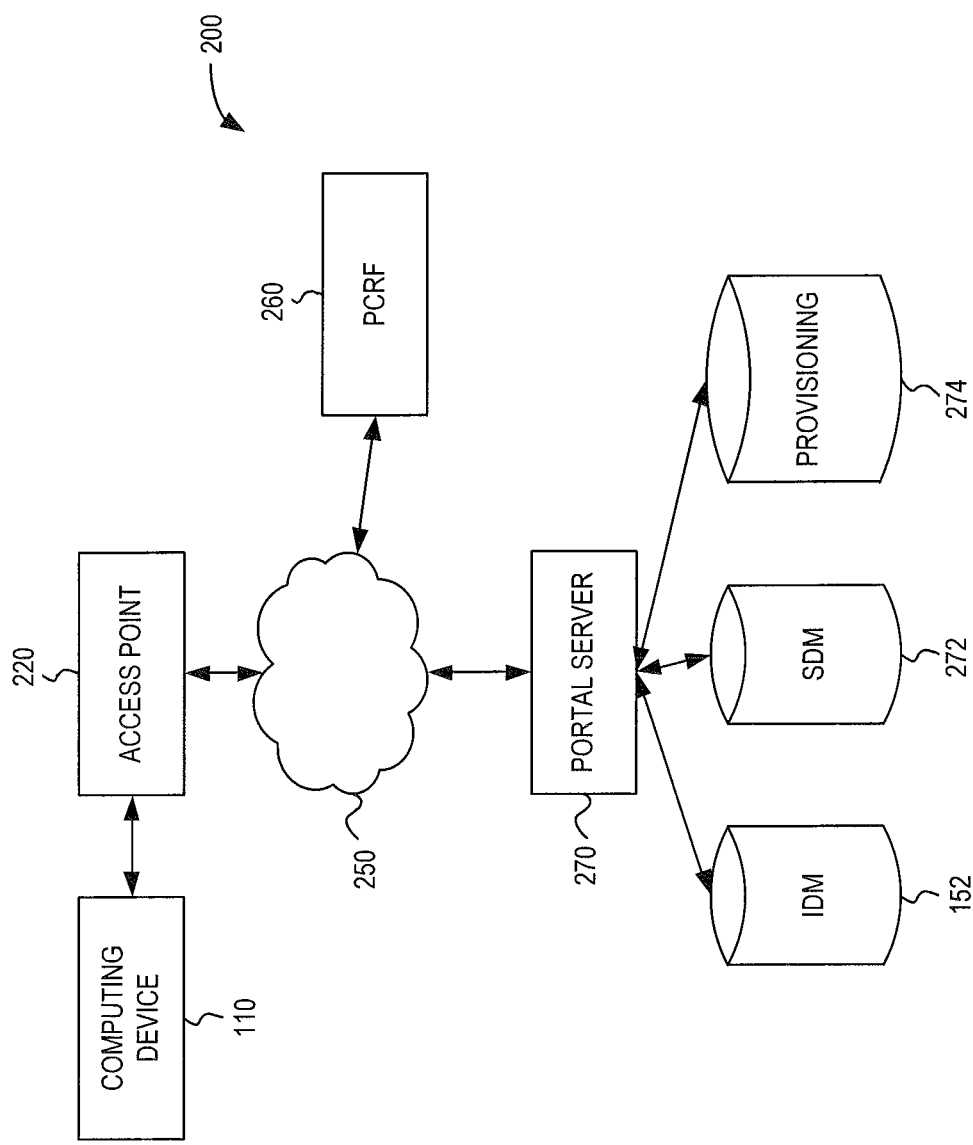
FIG. 2 is a block diagram of a device registration system for use with the token registration system of FIG. 1.

Referring now to FIG. 2, there is illustrated a block diagram of a device registration system 200. Device registration system 200 generally has a network on which the MAC address of a computing device 110 is discernible by access point 220.

Device registration system 200 includes computing device 110, WLAN access point 220, network 250, Policy Charging and Rules Function (PCRF) server 260, a portal server 270, IDM server 152, Subscriber Data Management (SDM) server 272 and provisioning server 274. In some embodiments, one or more of IDM server 152, SDM server 272 and provisioning server 274 may be integrated into a single server.

Generally, when connected to device registration system 200, computing device 110 is no longer connected to a network 130, as in system 100. This may occur when a user physically relocates computing device 110, for example by leaving home and travelling elsewhere.

Computing device 110 is wirelessly connected to WLAN access point 220, which is configured to relay data packets between one or more wirelessly-connected computing devices 110 and a network 250. WLAN access point 220 may be provided at various locations as described herein, such as airports, shopping centres and the like.

Network 250 is a service provider data network, which may be further connected to the Internet.

Portal server 270 is a computer server that generally has a processor, memory and a communications interface. In some embodiments, portal server 270 may be integrated with, or be the same as, portal server 140 of system 100. Portal server 270 may be configured to provide a Hypertext Transfer Protocol (HTTP) server, which may be used to provide a captive portal service, as described herein. In particular, when computing device 110 attempts to join network 250 and use an HTTP service, it may be redirected to the captive portal provided by portal server 270 (e.g., using an HTTP Redirect).

Portal server 270 may be in communication with a PCRF server 260 operated by the network service provider. PCRF server 260 can be configured to aggregate information from network 250 and portal server 270 and make policy decisions for each computing device 110 connected to network 250. Policy decisions may include whether to allow access to the network 250, whether to allow access to certain services, quality of service (QoS) levels and charging functions. PCRF server 260 may also communicate or integrate with other service provider systems, such as customer database server 156.

Portal server 270 is also in communication with IDM server 152 and may communicate with other services, such as SDM server 272 and provisioning server 274.

SDM server 272 generally may store subscriber data and, in particular may store a database of subscriber device MAC addresses, device limits and service eligibility.

Provisioning server 274 generally performs device registration by recording MAC addresses in one or both of SDM server 272 and PCRF server 260.

Figure 3:
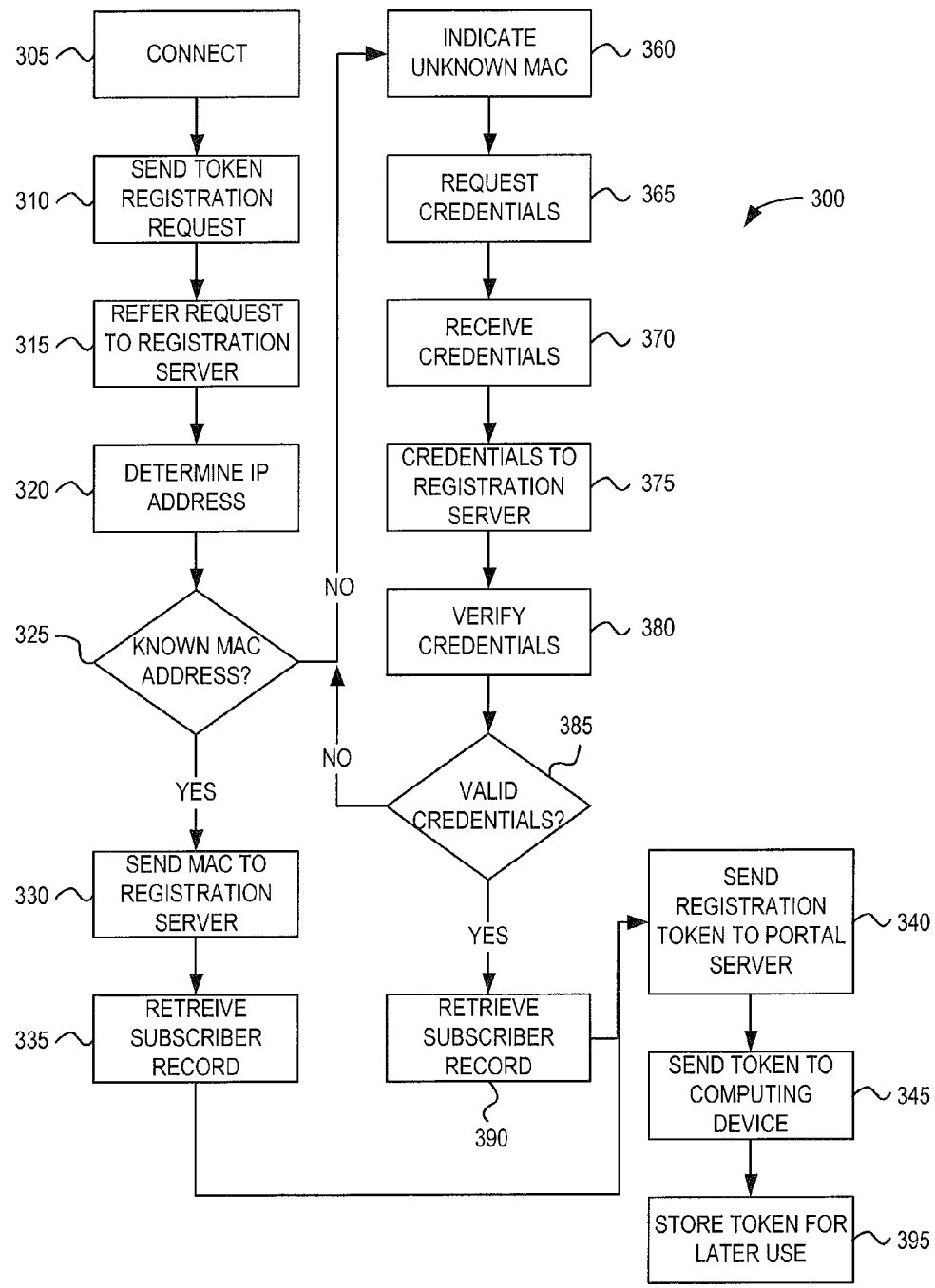
FIG. 3 is a flow diagram for an example token registration process.

Referring now to FIG. 3, there is illustrated a flow diagram for an example token registration process, which may be carried out in a token registration system 100.

Token registration flow 300 begins at 305, when a computing device, such as computing device 110 of system 100, connects to a first network, such as network 130 of system 100, via an access point (e.g., access point 120 of system 100).

At 310, the computing device sends a token registration request to a portal server, such as portal server 140. The token registration request may be generated by a web browser of the computing device, or by a dedicated application.

At 315, the portal server receives the token registration request and refers the request to a registration server, such as registration server 150 of system 100. The request may be referred by, for example transmitting a new request. In other embodiments, the request may be referred by using an asynchronous request (e.g., Ajax) within a web page generated by the portal server.

At 320, the registration server determines the IP address associated with the token registration request, and sends a mapping request for a corresponding MAC address to an address mapping server, such as address mapping server 154 of system 100. The IP address associated with the token registration request will generally be a publicly routable IP address, which is assigned to the network access device or access point through which the computing device is connected. Thus, the MAC address of the network access device or access point will be retrievable by the service provider.

At 325, the address mapping server determines if the IP address in the mapping request has a match for the access device MAC address in its database. If a matching MAC address is found, this indicates that the token registration request originated from behind a known device (e.g., network access device or access point).

If a matching MAC address is found, it is returned to the registration server at 330 and the registration server retrieves a subscriber record at 335, for example by sending a record request to a customer database server, such as customer database server 156. The record request may include the network access device or access point MAC address identified at 325.

If the customer record indicates that a computing device can be authorized for access to the network (and optionally to other networks), a registration authorization can be generated and transmitted to the portal server at 340, which can further generate and transmit a registration token to the computing device at 345. In some cases, the registration authorization may comprise a subscriber identifier that is uniquely associated with the subscriber record. Likewise, the registration token may comprise the unique subscriber identifier. The subscriber identifier may be hashed or encrypted. In some other cases, the registration authorization may be generated by computing a hash message authentication code (HMAC) based on one or more subscriber identifiers. For example, the subscriber account number, preferred device name, preferred e-mail address, or some combination thereof, can be hashed. In such cases, the registration token generated in response to the registration authorization may include the HMAC.

At 395, the computing device can store the registration token for later use. As described herein, in at least some embodiments, the registration token may be a web browser cookie.

Optionally, if the address mapping server determines that the IP address does not map to the MAC address of a known network access device or access point, the flow can continue at 360, with the registration server returning an indication to the portal server that a known MAC address was not found.

At 365, the portal server can instead request subscriber credentials, such as a username and password associated with a subscriber account. At 370, the computing device can obtain the subscriber credentials—for example, by having a user enter this information in a user interface—and transmit this information the portal server.

At 375, the portal server transmits the subscriber credentials to the registration server, which verifies the subscriber credentials with an IDM server, such as IDM server 152, at 380.

If IDM server indicates that the subscriber credentials are invalid, the portal server may be notified at 385, and further action can be taken (e.g., repeat credential gathering process). Otherwise, if the subscriber credentials are valid, the IDM server may notify the registration server at 390, which may generate and transmit a registration authorization at 340, before continuing to 345 and 395.

Figure 4:
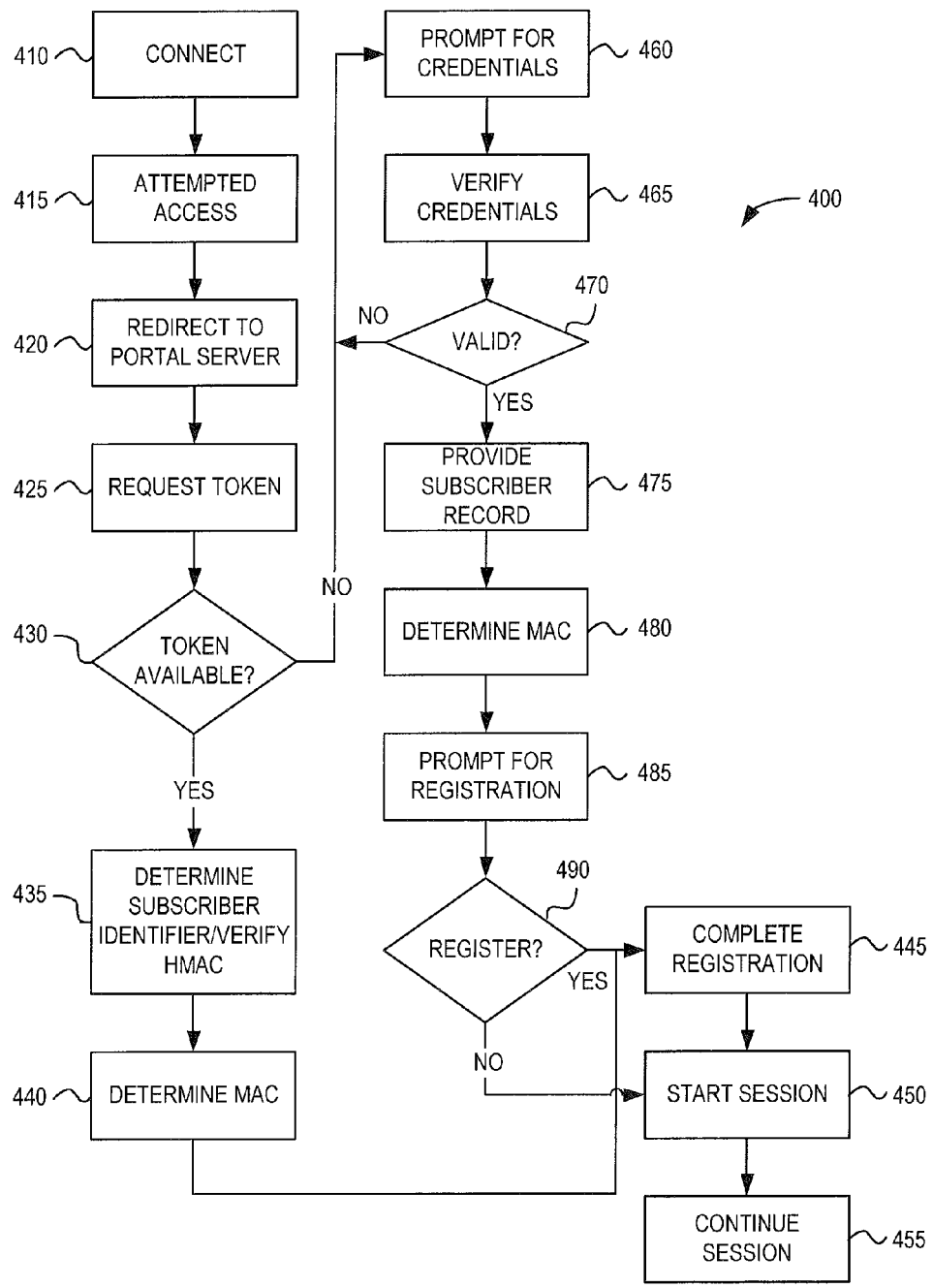
FIG. 4 is a flow diagram for an example device registration process.

Referring now to FIG. 4, there is illustrated a flow diagram for an example device registration process, which may be carried out in a device registration system 200.

Device registration flow 400 begins at 410, when a computing device, such as computing device 110 of system 200, connects to a second network, such as network 250 of system 200, via an access point (e.g., access point 220 of system 200).

At 415, a web browser or application of the computing device attempts to access a service using the network. The service may be an HTTP server on the Internet, for example.

At 420, the attempted access is intercepted, and the web browser or application of the computing device is redirected to a portal server, such as portal server 270 of system 200.

At 425, the portal server requests a registration token from the computing device. The requested registration token is a registration token previously generated in a token registration flow, such as token registration flow 300.

If a registration token was generated and stored at computing device, then the computing device forwards the registration token to the portal server at 430.

At 435, if a subscriber identifier was included in the registration token, the portal server determines a subscriber identifier from the registration token. If the subscriber identifier was encrypted, it may be decrypted at this stage. Alternatively, if the registration token included an HMAC, the HMAC may be authenticated.

At 440, the portal server determines the MAC address of the computing device. In at least some embodiments, a port-bundle host key (PBHK) identified by an access point may be used to determine the MAC address. Since the access point is generally operated by the network service provider or an affiliate, the MAC address can be determined directly.

Once the MAC address of the computing device is determined, the portal server sends a registration completion request comprising the MAC address to a provisioning server, such as provisioning server 274, at 445. The provisioning server receives the completion request and completes registration of the computing device by recording the computing device MAC address, which can be used directly for future authentication attempts.

Optionally, at 450, the portal server may contact a PCRF server, such as PCRF server 260 of system 200, to initiate a client session for the computing device.

At 445, the computing device can be redirected to the originally requested resource, or a landing page.

Optionally, if a registration token was not present at 430 or if the HMAC authentication fails, the portal server can instead request subscriber credentials, such as a username and password associated with a subscriber account at 460. The computing device can obtain the subscriber credentials—for example, by having a user enter this information in a user interface—and transmit this information the portal server.

At 465, the portal server transmits the subscriber credentials to an IDM server, such as IDM server 152 of system 200.

At 470, the IDM server determines if the subscriber credentials are valid. If the subscriber credentials are not valid, the IDM server may notify the portal server, which may return to 460.

Otherwise, if the subscriber credentials are valid, the IDM server may determine and return a subscriber identifier to the portal server at 475.

At 480, the portal server determines the MAC address of the computing device using a similar approach as at 440. For example, a port-bundle host key (PBHK) identified by an access point may be used to determine the MAC address.

At 485, the portal server may generate and transmit an indication to the computing device, requesting whether the user wishes to register the computing device.

At 490, the portal server receives a response to the indication. If the response indicates that registration should be completed, the flow proceeds to 445. Otherwise, the flow may proceed to 450 or 455.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments. The scope of the claims should not be limited by the described embodiments and examples, but should be given the broadest interpretation consistent with the description as a whole.

We claim:

1. A method of hardware address based registration of a computing device on a second network different from a first network, the method comprising:
   the computing device accessing a portal server via a network access device on the first network to initiate a hardware address-based registration;
   the computing device transmitting a token registration request to the portal server via the network access device, the token registration request received at the portal server from an IP address of the network access device;
   the computing device receiving a registration token from the portal server, the registration token comprising a unique subscriber identifier associated with a subscriber record, the registration token generated by the portal server in response to:
      determining that the network access device is identified in a database;
      based on identification of the network access device in the database, determining that the token registration request originates from a device other than the network access device; and
      verifying an access authorization of the subscriber record associated with the network access device;
   the computing device storing the registration token in a memory;
   the computing device accessing the second network; and
   the computing device transmitting the registration token to the portal server via the second network to complete the hardware address-based registration, wherein the hardware address-based registration is completed by the portal server determining a hardware address of the computing device via the second network, determining the unique subscriber identifier from the registration token, and provisioning the hardware address of the computing device for use on the second network in association with the subscriber record.

2. The method of claim 1, wherein the network access device is a modem.

3. The method of claim 1, wherein the registration token is generated by the portal server further in response to identifying a hardware address of the network access device based on the IP address of the network access device from which the token registration request was received, and wherein the network access device is recognized in the database based on a network access device hardware address.

4. The method of claim 1, wherein the first network comprises a wired network.

5. The method of claim 4, wherein the wired network comprises a coaxial cable network.

6. The method of claim 4, wherein the wired network comprises a public switched telephone network.

7. The method of claim 1, wherein the second network comprises a wireless network.

8. The method of claim 7, wherein the wireless network comprises a wireless local area network.

9. The method of claim 7, wherein the wireless network comprises a wireless metropolitan area network.

10. The method of claim 1, wherein the portal server provides an HTTPS service.

11. The method of claim 1, wherein registration token comprises a browser cookie.

12. The method of claim 1, wherein registration token comprises a subscriber identifier.

13. The method of claim 1, wherein registration token comprises a hash message authentication code.

14. The method of claim 1, wherein the hardware address is a media access control (MAC) address.

15. A method of hardware address based registration of a computing device on a second network different from a first network, the method comprising:
- receiving a token registration request from the computing device via a network access device on the first network, the token registration request received from an IP address of the network access device;
- the server identifying the network access device in a database and, based on the identification, determining that the token registration request originates from a device other than the network access device;
- the server verifying an access authorization of a subscriber record associated with the network access device;
- based on the verification, the server generating a registration token comprising a unique subscriber identifier associated with the subscriber record;
- the server transmitting the registration token to the computing device via the network access device on the first network;
- the server receiving the registration token directly from the computing device via the second network;
- determining a hardware address of the computing device via the second network;
- determining the unique subscriber identifier from the registration token; and
- provisioning the hardware address of the computing device for use on the second network in association with the subscriber record.

16. The method of claim 15, wherein the registration token comprises a hash message authentication code, further comprising authenticating the hash message authentication code.

17. A system for hardware address based registration of a computing device on a second network from a first network, wherein the computing device is connected via a network access device to the first network, the system comprising:
- a portal server comprising a first communications interface that operatively couples the portal server to the first network, a first processor and a first memory that stores executable instructions which, when executed by the first processor, cause the portal server to:
  - receive a token registration request from the computing device via a network access device on the first network, the token registration request received from an IP address of the network access device;
  - receive a registration token; and
  - transmit the registration token to the computing device via the network access device on the first network;
- a registration server comprising a second communications interface that operatively couples the registration server to the portal server, a second processor and a second memory that stores executable instructions which, when executed by the second processor, cause the registration server to:
  - receive the token registration request from the portal server via the first network;
  - identify the network access device in a database and, based on the identification, determining that the token registration request originates from a device other than the network access device;
  - verify an access authorization of a subscriber record associated with the network access device;
  - based on the verification, generate the registration token comprising a unique subscriber identifier associated with the subscriber record; and
  - transmit the registration token to the portal server via the first network; and
- an access portal comprising a third communications interface that operatively couples the access portal to the registration server and to the second network, a third processor and a third memory that stores executable instructions which, when executed by the third processor, cause the access portal to:
  - receive the registration token directly from the computing device via the second network;
  - determine a hardware address of the computing device via the second network;
  - determine the unique subscriber identifier from the registration token; and
  - provision the hardware address of the computing device for use on the second network in association with the subscriber record.

* * * * *